Figure 5:
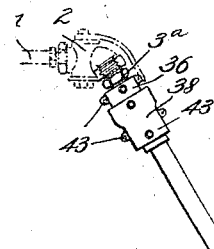

J. S. SHEAFE & V. TOBOLLA.
TRAIN PIPE HOSE.
APPLICATION FILED JAN. 7, 1915.
1,242,874.
Patented Oct. 9, 1917.
2 SHEETS—SHEET 1.
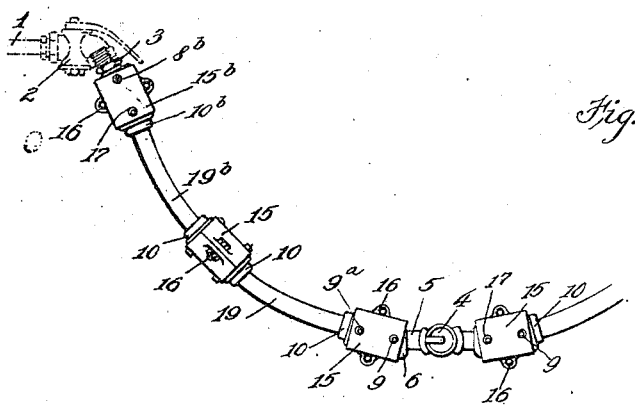
Fig. 1.
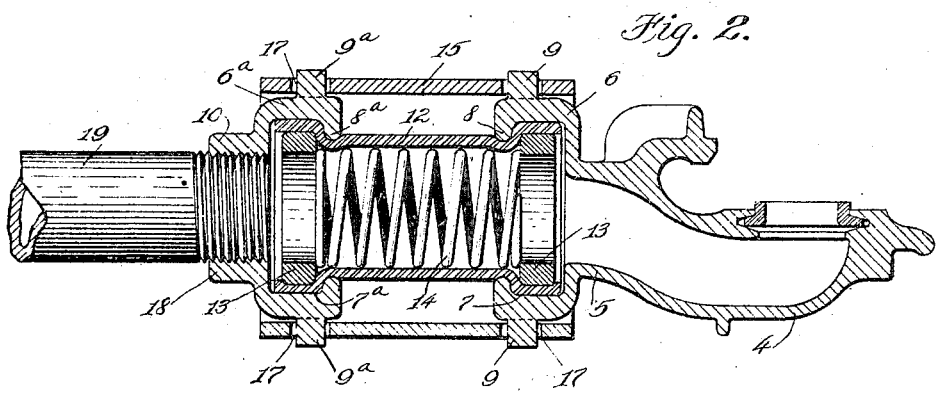
Fig. 2.
Fig. 4.
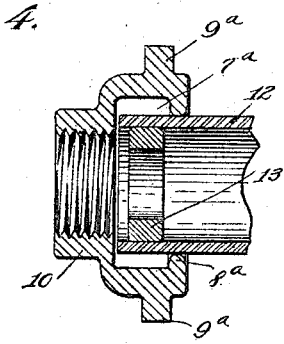
Fig. 3.
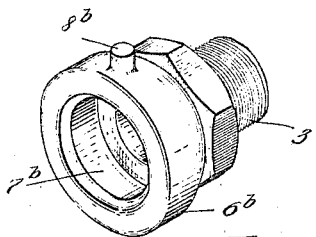
Witnesses:
R. L. Bruck
H. J. Small
Inventors,
James S. Sheafe
and Victor Tobolla
By Hull & Smith
Attys.

J. S. SHEAFE & V. TOBOLLA.
TRAIN PIPE HOSE.
APPLICATION FILED JAN. 7, 1915.

1,242,874.

Patented Oct. 9, 1917.
2 SHEETS—SHEET 2.

Witnesses:
R. L. Bruck
H. Small

Inventors,
James S. Sheafe and
Victor Tobolla
By
Knell & Smith Attys.

UNITED STATES PATENT OFFICE.

JAMES S. SHEAFE, OF NEW BRIGHTON, NEW YORK, AND VICTOR TOBOLLA, OF CHICAGO, ILLINOIS; SAID TOBOLLA ASSIGNOR TO SAID SHEAFE.

TRAIN-PIPE HOSE.

1,242,874.  Specification of Letters Patent.   Patented Oct. 9, 1917.

Application filed January 7, 1915. Serial No. 1,028.

*To all whom it may concern:*

Be it known that we, JAMES S. SHEAFE, a citizen of the United States, residing at New Brighton, Staten Island, county of Richmond, and State of New York, and VICTOR TOBOLLA, a subject of the Emperor of Germany, residing at Chicago, in the county of Cook and State of Illinois, have invented certain new and useful Improvements in Train-Pipe Hose, of which the following is a full, clear, and exact description, reference being had to the accompanying drawings.

This invention relates to the flexible connections whereby steam, compressed air, and like fluid are conveyed from car to car of railway trains, and has for its object the provision of certain constructions and arrangements of parts which will render these connections cheaper, more reliable, and longer lived than those heretofore in use. Ordinarily, according to contemporary practice, each car of the train is provided with a longitudinal pipe having the usual brake system, heating system, signaling system, and the like connected thereto and provided at each end with a cock or valve having a downwardly turned attaching portion, and to the attaching portion of each valve is attached a downwardly curving flexible pipe whose free end is provided with a coupling head adapted to mate with the similar coupling head of the adjacent pipe. This flexible connection has always heretofore in practice, to the best of our knowledge, been made of a length of extremely heavy hose formed of rubber and canvas, and sometimes reinforced with wire, and owing to the exposed location of the members coupled with the extremely heavy duty and the carelessness with which they are handled by the train men and other employees, the same have required very frequent replacement, as well as occasionally failing in service with consequent delay, annoyance, and sometimes even disaster to equipment. We are aware that it has been proposed to construct these members of jointed metallic sections, apparently with the hope of decreasing the cost of upkeep and increasing the reliability of performance, but such devices have to the best of our knowledge never been put into regular commercial use, wherefore it is the object of this invention to provide a device of this character which shall avoid the faults of prior devices which prevented their acceptance by the railway world by improving upon them in the direction of cheapness, simplicity and serviceability.

Figure 8:
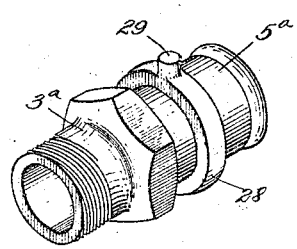
Figure 6:
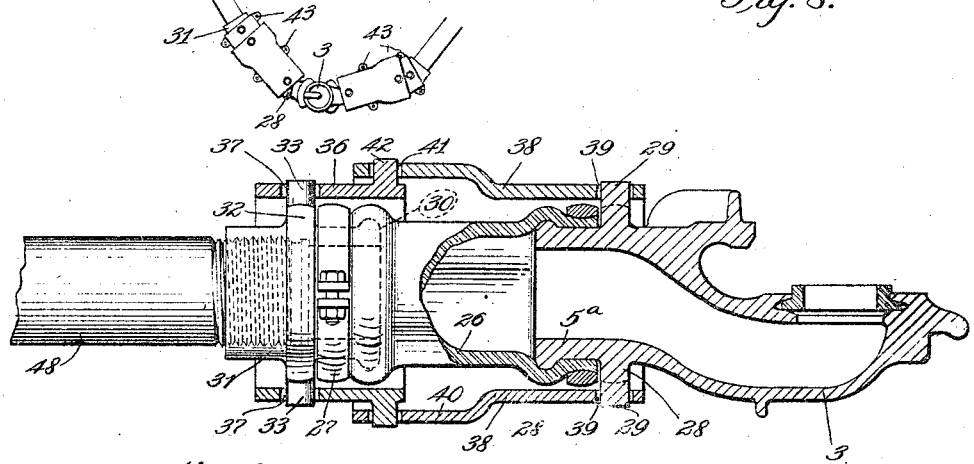
Figure 7:
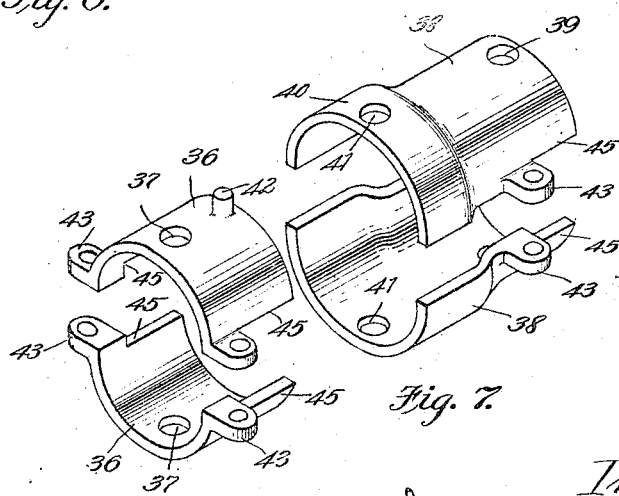

Generally speaking our invention may be defined as consisting of the constructions and combinations recited in the claims hereto annexed and illustrated in the drawings accompanying and forming a part of this specification, wherein: Figure 1 is a view in side elevation of one embodiment of our complete invention showing the same in use; Fig. 2 is a longitudinal sectional view taken through the coupler head end of a train pipe hose constructed in accordance with our invention; Fig. 3 is a perspective view of the angle cock connection; Fig. 4 is a detailed view showing the method of applying the clamping ring; Fig. 5 is a side elevational view showing a modified form of our invention in actual use; Fig. 6 is a longitudinal sectional view through the coupler head and a portion of the joint showing the construction of the same; Fig. 7 is a perspective view showing the separated part of the reinforcing member employed in Figs. 5 and 6; and Fig. 8 is a perspective view of the nipple connection employed in Fig. 5.

Describing the parts by reference characters, 1 represents the train pipe heretofore mentioned, and 2 the angle cock threaded at the end thereof, 3 represents the nipple which is screwed into the depending receiving portion of the angle cock and 4 represents the coupler head which is attached to the mating coupler head of the adjacent train pipe hose.

Our invention has been particularly devised for use in connection with coupler heads of the type which are placed together in raised condition and allowed to fall toward the ground thereupon becoming secured together as a result of their relative rotation, the coupling shown for purposes of illustration here being that of the well known "Westinghouse" or laterally facing type, although our invention is equally usable in connection with the end port coupler of the "Sewall", "Gould", "Dixon", or other types, and may be used for steam as well as for the air brake pipes.

Now referring specifically to the embodiments of our invention shown in Figs. 1-4, inclusive, each of these coupler heads is formed with a short receiving shank 5 terminating in an enlargement 6 interiorly chambered as shown at 7, the end of the chamber being defined by an inwardly projecting rib 8, and the exterior of the enlargement is formed with oppositely projecting radial trunnions 9—9 whose axes are substantially parallel to the axis about which coupling and uncoupling movement of the head must take place. Mating with this shank is a second connecting member 10 likewise having an enlarged member 6ª formed with an interior chamber 7ª and with the internal lips 8ª, its exterior being formed with trunnions 9ª—9ª. Projecting into the recesses 7—7ª are the ends of a short piece of rubber hose 12, these ends being preferably secured in place by means of clamping rings 13 of soft ductile metal inserted into the hose as shown in Fig. 4 and afterward expanded into place so as to grip the same against the walls of the recesses and around the lips 8—8ª as illustrated in Fig. 2. Inside of this hose a wire helix 14 may be employed if desired so as to prevent kinking or collapsing of the hose, although the length of the hose being comparatively small (from two to three inches in the case of the standard coupler head) this may not be necessary in all cases. Around these members we secure a hollow cylindrical sleeve 15 which is longitudinally split in two parts secured together by suitable bolts 16, the sleeves being formed with suitable apertures 17 loosely receiving the trunnions 9—9ª. The side of the member 10 opposite to the hose 12 is formed with a threaded boss 18 adapted for the reception of a rigid pipe 19.

The connection between the angle cock and the train pipe hose is preferably of the same nature as that already described, the nipple 3 having at its outer end an enlargement 6ᵇ formed with an internal recess 7ᵇ and external trunnion 8ᵇ, the same type of hose and clamping rings being employed as before, and connected by means of a similar connection 10ᵇ and sleeves 15ᵇ with a rigid pipe 19ᵇ. In some cases the pipe members 19 and 19ᵇ may be the same, but in the present embodiment we have shown the same as connected by a flexible joint of the same type as hereinbefore described, each of the pipes being provided at its ends with a connecting member 10, joined interiorly by suitable hose connections such as those heretofore described. This we esteem the preferable construction by reason of the greater flexibility developed, and when so employed we prefer to arrange the various joints as illustrated in Fig. 1, the trunnions at the upper and lower ends of the hose being substantially horizontal, and those of the middle joints being arranged at right angles thereto. This permits the necessary movement of the coupler for joining the hose ends, for the necessary straightening of the hose between the angle cocks upon emergency uncoupling, and for side sway of the hose and the rounding of curves. In addition the apertures preferably receive the trunnions rather loosely so that a reasonable amount of play is permitted in all directions, although this looseness must be confined within such limits as to cause all mechanical strain to be carried by the metal parts and none whatever by the rubber hose.

In the embodiment of our invention illustrated in Figs. 5-8 inclusive we have disclosed the employment of compound joints and a different sort of hose connection, these joints being of greater flexibility than those previously described. In this embodiment the train pipe, angle cock. and hose coupler remain as before, the latter having a short shank 5 adapted to receive the hose or flexible section 6 exteriorly, the same being secured by means of an external clamping ring 7. Adjacent to the end of this hose or flexible section the shank is formed with an external circumferential enlargement 28 formed with oppositely projecting radial trunnions 29 which like the preceding trunnions are arranged parallel to the axis of coupling and uncoupling movement. The opposite end of this hose or flexible section is received upon a shank 30 of a pipe connection 31 and likewise secured by a clamping ring 27, the connection 31 being similarly formed with an enlargement 32 equipped with trunnions 33—33.

In order to shield the said flexible section from all external injury, and to relieve the same from all mechanical strain, we provide a system of external, interfitting shells shown separated in Fig. 7 and in one embodiment comprising a pair of semi-cylindrical members 36—36 adapted to be clamped about one of the foregoing members, and formed with radial apertures 37 adapted for the reception of the trunnions 33—33 thereof, and a second pair of generally semi-cylindrical members 38—38 adapted to surround the other of the foregoing members and having radial apertures 39—39 adapted for the reception of the trunnions 29—29 thereof. One end of one pair of members, such as 38—38 is interiorly enlarged as shown at 40 for the reception of the other member and formed with radial apertures 41—41 for the reception of corresponding pins or trunnions 42—42 with which said other member is provided. The side edges of the semi-cylindrical members are provided adjacent to their meeting portions with laterally extending ears 43—43 for the reception of suitable bolts or screws whereby they may be secured together and the members may be notched or cut away as shown at 45—45 to provide space for the ears of the clamping rings.

To the rearward side of the connection 31 is attached a rigid pipe member 48 of a suitable length to bring the coupling head at the proper distance above the ground, the opposite end of this pipe being connected to the nipple 3ª by means of a joint similar in all respects to that illustrated in Fig. 6.

In the preferred construction all the trunnions are arranged substantially horizontal, thus permitting the necessary movement of the coupler heads for manual coupling and uncoupling and the necessary straightening of the hose for emergency uncoupling. The requisite side sway of the hose can be permitted by making the trunnions of slightly less size than the apertures in which they are received. It will be seen that a hose of this nature may be employed in connection with a hose either of the same nature or of the standard material heretofore in use, thus permitting the change from one to the other to be made gradually. Also the automatic unlocking of the coupling heads upon longitudinal strain is not interfered with, although the metallic sheath prevents abrasion or mutilation of the flexible connections from outside, and support all mechanical strains and blows, thus permitting a lighter, thinner fabric to be employed and increasing the life of the same. It will be apparent, however, that a great many changes in detail matters may be made within the scope of our invention and all such changes we desire to claim and secure so far as permitted by the prior art.

Having thus described our invention, what we claim is:

1. In a device of the character described, the combination with a coupler head of the type adapted to be secured to a mating head by relative rocking of said heads about a transverse axis, of a section of flexible material clamped to said head, a connection clamped to the other end of said section and a cylindrical metal shell pivotally attached to said coupler head and to said connection and surrounding said flexible connection and adapted to take undue mechanical strains from said flexible section.

2. In a device of the character described, the combination with a coupler head of the type adapted to be secured to a mating head by relative rocking of said heads about a transverse axis said head having a hollow shank, of a connection having a shank, a section of flexible material clamped to both said shanks, and a cylindrical metal shell attached to each of said shanks by a lost motion connection and surrounding said flexible connection.

3. In a device of the character described the combination of a coupler head of the type adapted to be secured to a mating head by relative rocking of said heads about a transverse axis, said head having a hollow shank, of a connection having a hollow shank, each of said shanks being formed with radial trunnions, a section of flexible material clamped securely to both of said shanks, and a cylindrical metal shell surrounding said flexible section and having apertures loosely receiving said trunnions.

4. In a device of the character described, the combination of a coupler head of the type adapted to be secured to a mating head by relative rocking of said heads about a transverse axis, said head having a hollow shank, of a connection having a hollow shank, each of said shanks being formed with radial trunnions, a section of flexible material securely clamped to both of said shanks, and a longitudinally split cylindrical metal shell surrounding said flexible section and having apertures loosely receiving said trunnions.

5. In a train pipe hose, the combination, with rigid connecting members having hollow shanks, of radial trunnions projecting from the exterior of said shanks, sections of flexible material securely clamped to adjacent shanks, and cylindrical metal shells surrounding said flexible sections and having apertures loosely receiving said trunnions.

6. In a train pipe hose, the combination, with rigid connecting members having hollow shanks, of radial trunnions projecting from the exterior of said shanks, sections of flexible material securely clamped to adjacent shanks, and cylindrical metal shells surrounding said flexible sections and having apertures loosely receiving said trunnions, the trunnions of adjacent connections being angularly related to each other.

7. In a device of the character described, the combination, with a coupler head of the type adapted to be secured to a mating head by relative rocking of said heads about a transverse axis, said head having a hollow shank, of a connection having a shank, a pair of radial trunnions projecting from opposite sides of each of said shanks, the axis of such trunnions being substantially parallel to the axis of rocking movement, a section of flexible material securely clamped to both of said shanks, and a cylindrical metal shell loosely receiving said flexible section and having apertures receiving said trunnions.

8. In a train pipe hose, the combination, with a rigid coupler member having a hollow shank and having radial trunnions projecting in opposite directions from the sides of said shank, of a flexible section securely clamped to said shank, and a rigid shield surrounding said flexible section and having apertures for loosely receiving said trunnions.

9. A train pipe hose consisting of a plurality of rigid metal sections having connections at their ends each of said connections including a hollow shank carried by the section, a pair of oppositely projecting trunnions carried by each connection, flexible sections connecting adjacent shanks, said sections being securely clamped thereto and longitudinally split hollow cylindrical sleeves clamped about said flexible sections and having radial apertures loosely receiving said trunnions.

10. A train pipe hose comprising sections of rigid pipe, connections for the ends of said pipe, each of said connections comprising hollow chambered shanks having external projections, flexible connections whose ends are clamped within the chambers of said shanks, and longitudinally split cylindrical shielding sections clamped upon said projections.

11. In a train pipe hose comprising sections of rigid pipe, a connection for said sections comprising opposed hollow shanks, said shanks having annular transverse shoulders projecting from their adjacent ends and radial trunnions on their exterior, a tubular section of flexible material connecting said shanks and being engaged near the ends thereof by said transverse shoulders, clamping rings engaging the extreme ends of said flexible section for clamping and distorting the same around said shoulders, and a metallic cylindrical shielding section surrounding said flexible section and shanks and having apertures therein for loosely receiving said trunnions.

12. In a train pipe hose comprising sections of rigid pipe, a connection for said sections comprising opposed hollow shanks, said shanks, having projecting inwardly from the ends transverse shoulders and having radial trunnions on their exterior, a tubular section of flexible material whose ends are inserted within the shouldered ends of said shanks, clamping rings located within the shanks and intermediate their ends and engaging the ends of said tubular section and adapted to be expanded to clamp the ends of said tubular section against the interior of the shank and to distort the same around said shoulders, and a metallic cylindrical shielding section surrounding said flexible section and shanks and having apertures therein for loosely receiving said trunnions.

13. In a train pipe hose comprising sections of rigid pipe, a connection for said sections comprising opposed hollow shanks, said shanks having projecting inwardly from the ends transverse shoulders and having radial trunnions on their exterior, a tubular section of flexible material whose ends are inserted within the shouldered ends of said shanks, clamping rings located within the shanks and intermediate their ends and engaging the ends of said tubular section and adapted to be expanded to clamp the ends of said tubular section against the interior of the shank and to distort the same around said shoulders, a spring located within the tubular section whose ends abut against the expansible rings, and a metallic cylindrical shielding section surrounding said flexible section and shanks and having apertures therein for loosely receiving said trunnions.

In testimony whereof, we hereunto affix our signaturs in the presence of witnesses.

JAMES S. SHEAFE.
VICTOR TOBOLLA.

Witnesses to signature of James S. Sheafe:
A. CONLEY,
J. E. WOODS.

Witnesses to signature of Victor Tobolla:
W. T. JONES,
E. P. WILLIAMS.